Aug. 3, 1965 W. W. PRATHER 3,199,077
CODE AND COMPLEMENT TESTING DEVICE
Filed Aug. 21, 1961 6 Sheets-Sheet 1
FIG 1
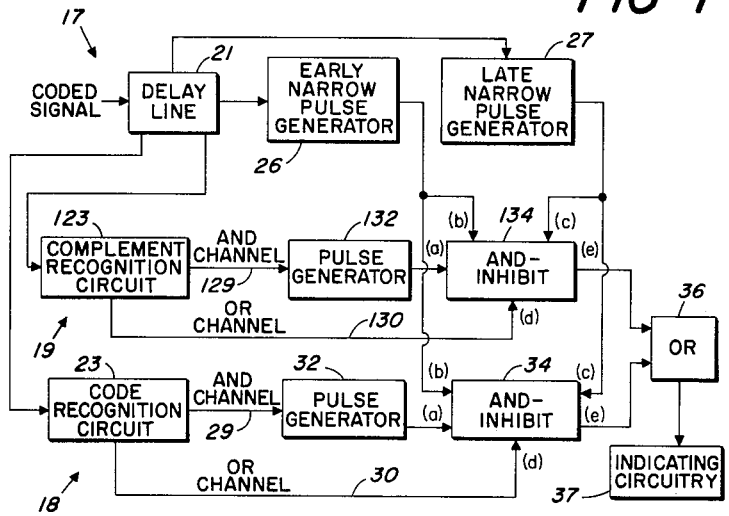
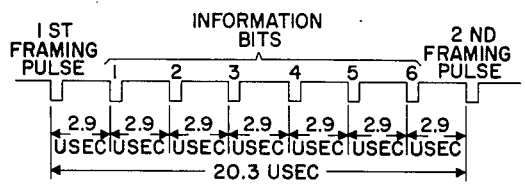
FIG 5
FIG 13    FIG 14    FIG 15
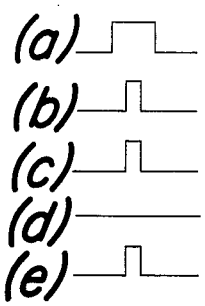 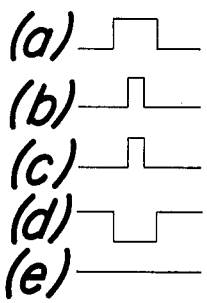 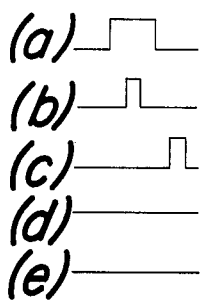
INVENTOR.
WALLACE W. PRATHER
BY Moody and Harris
ATTORNEYS

FIG 2

Aug. 3, 1965  W. W. PRATHER  3,199,077
CODE AND COMPLEMENT TESTING DEVICE
Filed Aug. 21, 1961  6 Sheets-Sheet 3
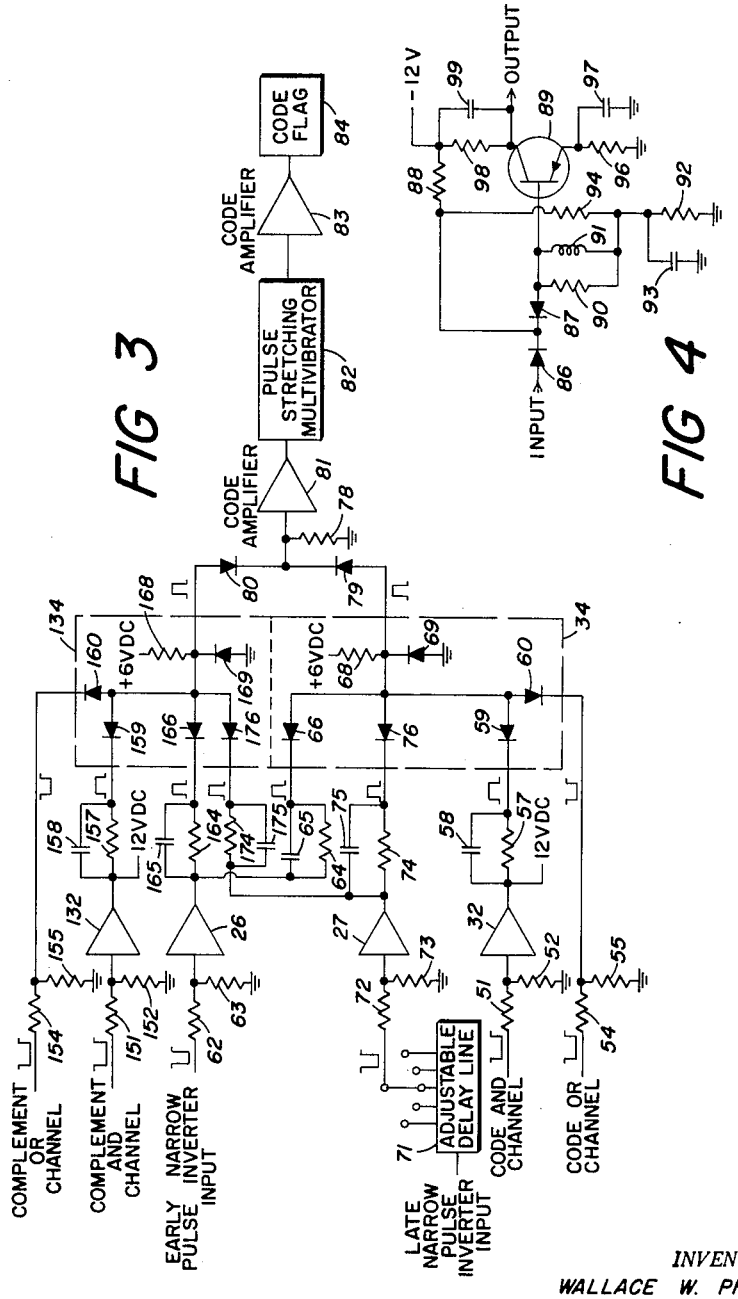
INVENTOR.
WALLACE W. PRATHER
BY
Moody and Harris
ATTORNEYS Aug. 3, 1965 W. W. PRATHER 3,199,077
CODE AND COMPLEMENT TESTING DEVICE
Filed Aug. 21, 1961 6 Sheets-Sheet 4
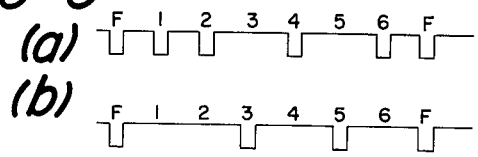
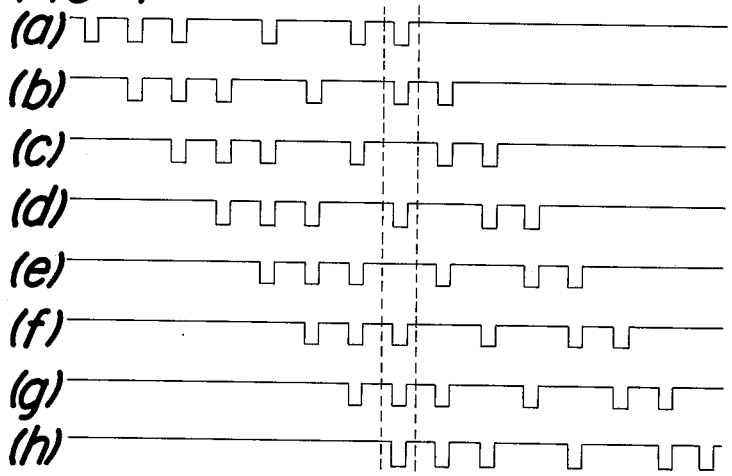
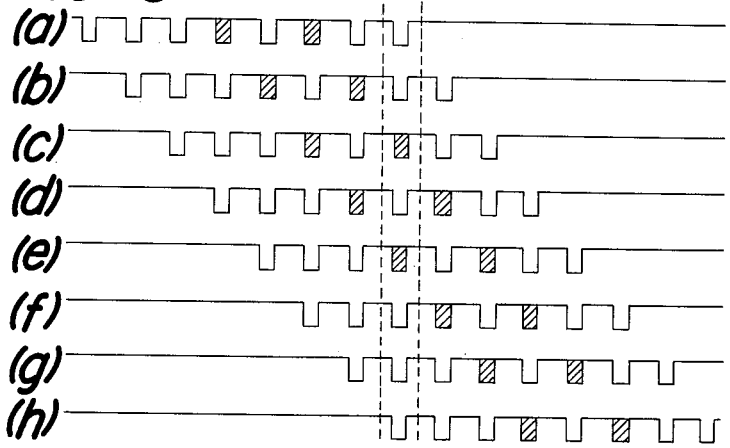
INVENTOR.
WALLACE W. PRATHER
BY Moody and Harris
ATTORNEYS Aug. 3, 1965 W. W. PRATHER 3,199,077
CODE AND COMPLEMENT TESTING DEVICE
Filed Aug. 21, 1961 6 Sheets-Sheet 6

INVENTOR.
WALLACE W. PRATHER
BY Moody and Harris
ATTORNEYS

United States Patent Office 3,199,077
Patented Aug. 3, 1965

3,199,077
CODE AND COMPLEMENT TESTING DEVICE
Wallace W. Prather, Cedar Rapids, Iowa, assignor to Collins Radio Company, Cedar Rapids, Iowa, a corporation of Iowa
Filed Aug. 21, 1961, Ser. No. 139,566
6 Claims. (Cl. 340—146.1)

This invention relates to an electrical pulse checking device and more particularly to a device for checking a coded reply signal such as that produced by a transponder.

A conventional transponder normally produces a reply signal comprising a series of information bits timewise spaced between two referencing or framing pulses. Since the information bits may each consist of either a pulse or the absence of a pulse, the over-all transponder reply signal may be coded in any predetermined manner. It is essential, of course, that apparatus such as a transponder reply signal be identical to that of the predetermined code since one use of such a coded reply signal is for identification purposes. Hence, if any information bit consists of a pulse where the absence of a pulse is required, or, on the other hand, if any information bit consists of the absence of a pulse where a pulse is required, the coded reply signal will be in error. In addition, if the spacing of the bits, and more particularly the spacing between the framing or referencing pulses is in error, this, too, can, in effect, appear as an erroneous reply signal.

While testing devices have previously been proposed and utilized to check spacing between pulses and to check for the presence or absence of particular pulses, no testing apparatus has been provided, heretofore, that is capable of positively checking each bit of a reply signal, both for the presence and absence of a pulse, as well as checking the spacing of the framing pulses, without requiring readjustment or switching in the testing apparatus in carrying out the entire testing procedure.

It is, therefore, an object of this invention to provide an improved testing apparatus capable of completely checking each bit of a reply signal both in the pulse and no pulse conditions without requiring that the testing apparatus be readjusted or switched in any manner during the entire testing interval.

More particularly, it is an object of this invention to provide a testing apparatus having a first channel to decode a preselected coded signal and a second channel to decode the complement of said preselected coded signal to thereby test each bit of said signal to assure proper functioning of the means producing each bit both in the pulse and no pulse conditions.

It is another object of this invention to provide testing apparatus which may be utilized to not only test the presence or absence of a pulse for each information bit of a reply signal but to also check the time duration between the framing pulse preceding and the framing pulse following the information bits to assure proper spacing therebetween.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which:

FIGURE 1 is a block diagram of the pulse testing apparatus of this invention;

FIGURE 2 is a schematic presentation of a portion of the pulse testing apparatus as shown in block form in FIGURE 1;

FIGURE 3 is a partial schematic presentation of that portion of the pulse testing apparatus as shown in block form in FIGURE 1 and not illustrated in schematic form in FIGURE 2;

FIGURE 4 is a schematic presentation of a typical pulse generator which may be utilized in this invention;

FIGURE 5 is a presentation of a typical reply signal illustrating the positioning and spacing of a coded signal having two framing pulses and six information bits;

FIGURE 6(a) is a presentation of a particular coded reply signal that may be received and tested by the testing means of this invention;

FIGURE 6(b) is a presentation of the complement coded reply signal of the particular coded reply signal illustrated in FIGURE 6(a);

FIGURE 7 is a presentation of the coded reply signal of FIGURE 6(a) as progressively delayed and coupled to the code recognition circuit utilized in the invention;

FIGURE 8 is a presentation similar to FIGURE 7 except that simulated pulses have been added in the code recognition circuit;

FIGURE 13 is a series of waveforms illustrating the output pulse that may be obtained at various designated points in the testing apparatus of this invention when the apparatus tested is functioning properly;

Figure 9:
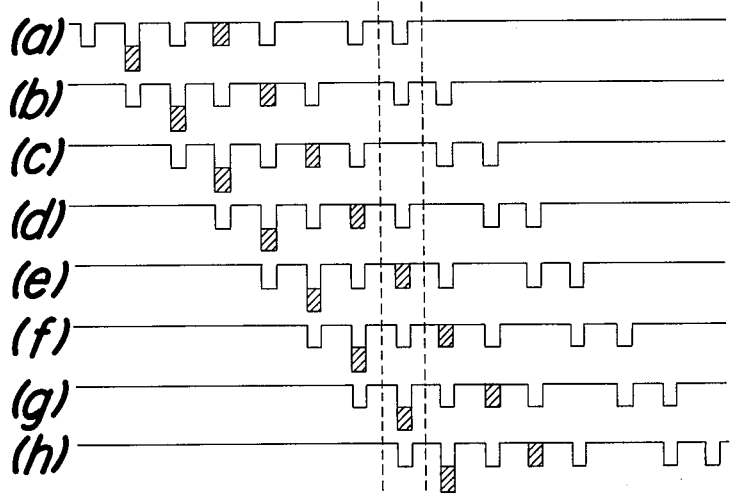
FIGURE 9 is a presentation of a coded reply signal with simulated pulses added wherein the information bits are erroneous with respect to FIGURE 6(a) as a reference.

FIGURE 14 is similar to FIGURE 13 but illustrating the absence of an output pulse to the indicating circuitry when the apparatus tested is producing a pulse at an information bit where no pulse is required; and FIGURE 15 is similar to FIGURE 13 but illustrating the absence of an output pulse to the indicating circuitry when the apparatus tested is producing a coded signal having incorrect spacing between the framing pulses.

Referring now to the drawings, the numeral 17 refers generally to the testing apparatus of this invention, which testing apparatus has a code recognition channel 18 and a complement code recognition channel 19.

As shown in FIGURE 1, a coded input signal may be coupled to a delay line 21. This coded signal, as shown in FIGURE 5, may be the coded reply signal from a transponder consisting of a pair of framing pulses, the latter of which occurs timewise 20.3 microseconds after the former, measured from leading edge to leading edge, and six information bits occurring timewise between said framing pulses with a spacing of 2.9 microseconds between the leading edges of each bit.

It is to be appreciated, of course, that while the testing apparatus of this invention is particularly useful in decoding the reply signal of a transponder having two framing pulses and six information bits, it could be used equally well, for example, to decode other pulse coded signals regardless of the number of information bits utilized and could decode such information bits in the absence of framing pulses if desired, although spacing could not then be checked with close tolerances. Accordingly, the invention is not meant to be limited to the precise structure illustrated.

Delay line 21 is tapped at various points equal to the time spacing between information bits, as is conventional. The multiple outputs (only a single output lead to indicate the multiple outputs has been shown in FIGURE 1 for convenience) is coupled to code recognition circuit 23 and to complement coded signal recognition circuit 123. As used herein, a complement coded signal is one that is the opposite of the predetermined code utilized. As shown in FIGURE 6(a), for example, the third and fifth bits of the coded signal consist of the absence of a pulse. Hence, as shown in FIGURE 6(b), pulses will appear only in the third and fifth bits in the complement coded signal, the framing pulses, of course, always being present.

The output from delay line 21 is also applied to early narrow pulse generator 26 and to late narrow pulse generator 27, the output to the early pulse generator being tapped from the delay line with approximately 0.2 microsecond delay while the output to the late narrow pulse generator is tapped from the delay line with a 20.3 microsecond delay.

Code recognition circuit 23 comprises, essentially, a code "AND" channel 29 and a code "OR" channel 30. Code "AND" channel 29 includes, as is brought out more fully hereinafter, a coincidence circuit wherein each of the framing pulses and information bits (which includes both pulses and simulated pulses) must occur simultaneously at all eight inputs from delay line 21 to produce an output signal. The "OR" channel, on the other hand, as is also brought out more fully hereinafter, includes a circuit wherein coincidence is not required and hence will pass an information pulse through any unblocked diode therein.

The output from the code "AND" channel is applied to pulse generator 32 where a comparatively wide pulse (approximately 0.4 microsecond in width) of opposite polarity is generated and coupled to the "AND-INHIBIT" gate 34. The "OR" channel output from code recognition circuit 23 is likewise applied to "AND-INHIBIT" gate 34 (also approximately 0.4 microsecond in width), as are the output pulses from the early narrow pulse generator 26 and the late narrow pulse generator 27 (both of which are approximately 0.15 microsecond in width), the latter two being of the same polarity as is the output pulse from pulse generator 32. As will be explained more fully hereinafter, if the framing pulses are correct as to spacing, and if the information bits are of the correct state as to pulse or no pulse, an output pulse will be coupled from the "AND-INHIBIT" gate through "OR" gate 36 to indicating circuitry 37 where the pulse will activate the indicating circuitry to indicate that the apparatus being tested is functioning properly.

Complement recognition circuit 123 may be identical to code recognition circuit 23 and the "AND" channel output 129 therefrom coupled to pulse generator 132. The output from pulse generator 132 is coupled to "AND-INHIBIT" gate 134 as is the output from the "OR" channel 130. The output from "AND-INHIBIT" gate 134, like that of "AND-INHIBIT" gate 34, is coupled to "OR" gate 36 and hence to the indicating circuitry 37.

Figure 2:
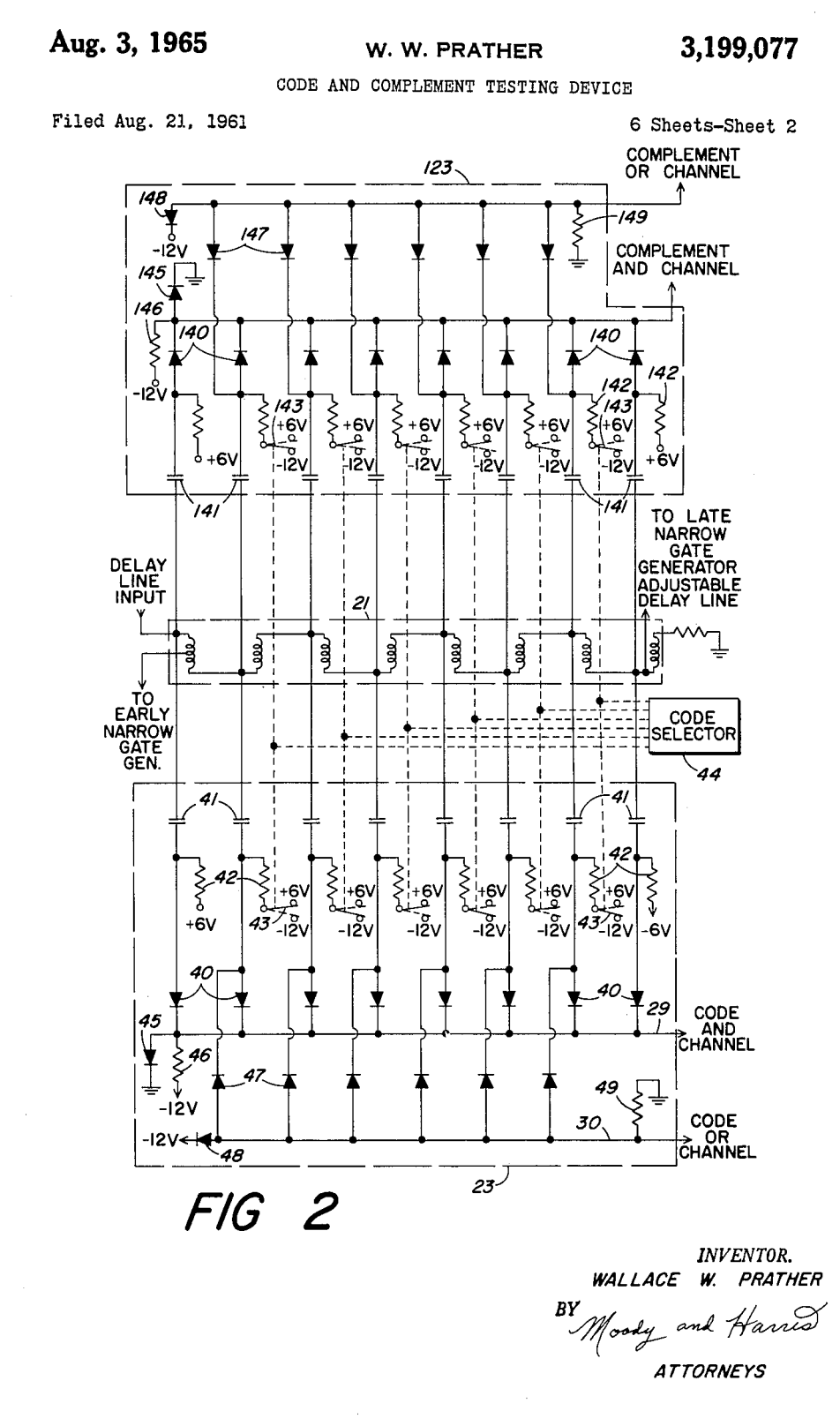

As shown in FIGURE 2, delay line 21 is tapped at 2.9 microsecond intervals and coupled to the anode of a diode 40 through a capacitor 41 in both the code and complement recognition circuits (in the complement code recognition circuit all like components are designated in the hundreds).

In addition, the anode of diode 40 is connected through a resistor 42 and a two position switch 43 to a source of power either −12 volts D.C. or +6 volts D.C., depending upon the position of the switch in each case. The two framing pulses, however, are always present and hence do not require a switch 43 since these pulses need never be simulated and can therefore be constantly connected to the +6 volt D.C. power source. Switches 43 and 143 (code complement circuit) may be connected to code selector 44 and each switch of the code recognition circuit may be constrained to movement with the like switch in the complement code recognition circuit to assure proper selection of the complement code when the primary code is selected.

The cathodes of diodes 40 are connected in common through diode 45 to ground and through resistor 46 to the −12 volt D.C. power supply. As shown in FIGURES 1 and 2, the output from the code "AND" channel is taken from the cathodes of the diodes 40 and coupled to pulse generator 32 for the code recognition circuit and to pulse generator 132 for the complement code recognition circuit.

The six information inputs to the recognition circuits from the delay line, that is, the six inputs for the information bits between the framing pulses, are connected in the "OR" channel by coupling each input through capacitor 41 to the cathode of the diode 47 connected therewith. The anodes of diodes 47 are connected in common to the anode of diode 48, the cathode of which is connected to the −12 volt D.C. power supply. In addition, the anode of diode 48 is connected through a resistor 49 to ground. The output of the "OR" channel is taken from the anodes of diodes 47 and coupled to the "AND-INHIBIT" gates as shown in FIGURES 1 and 2.

As shown in FIGURE 3, the output pulse from the code "AND" channel is coupled through a resistor 51 to pulse generator 32. In addition, a resistor 52 may be connected between ground and the junction of resistor 51 and generator 32. The output from the code "OR" channel is likewise coupled through a resistor 54 to "AND-INHIBIT" gate 34, while a resistor 55 may be connected between ground and the junction of gate 34 and resistor 54. In like manner, the output from the complement "AND" channel is coupled to pulse generator 132 through resistor 151 having resistor 152 to ground, while the output from code "OR" channel is coupled to "AND-INHIBIT" gate 134 through resistor 154 having resistor 155 to ground.

The output from pulse generator 32 is coupled through a resistor 57 and capacitor 58, connected in parallel, to the cathode of diode 59 in "AND-INHIBIT" gate 34. In addition, the junction of pulse generator 32 and resistor 57 is connected with the −12 volts D.C. power supply. In like manner, the complement "AND" channel is connected to the cathode of diode 159 in "AND-INHIBIT" gate 134 through resistor 157 and capacitor 158. The output from the code "OR" channel is coupled to the cathode of diode 60 in "AND-INHIBIT" gate 34, the anode of which diode is connected to the anode of diode 59. In like manner, the complement "OR" channel is connected to the cathode of diode 160 in "AND-INHIBIT" gate 134.

As shown in FIGURE 3, early narrow pulse generator 26 may be connected to delay line 21 through a series resistor 62 and one end of which has a resistor 63 to ground.

The output from early narrow pulse generator 26 is coupled through a resistor 64 in parallel with a capacitor 65 to the cathode of diode 66, which diode has its anode connected to the anode of diodes 59 and 60 in "AND-INHIBIT" gate 34. In addition, the anodes of diodes 59, 60, and 66 are connected through a resistor 68 to a +6 volt D.C. power supply and through a diode 69 to ground. The output from early narrow pulse generator 26 is also coupled through a resistor 164 and a capacitor 165, connected in parallel with resistor 164, to the cathode of diode 166, which diode is connected in "AND-INHIBIT" circuit 134 with its anode connected in common with the anodes of diodes 159 and 160. The anodes of diodes 159, 160 and 166 are also connected through resistor 168 to the +6 volt D.C. power supply and through diode 169 to ground.

As also shown in FIGURE 3, the input to late narrow pulse generator 27 from delay line 21 may be through an adjustable delay line 71, along with series resistor 72 one end of which has a parallel resistor 73 to ground.

The output from late narrow pulse generator 27 is coupled through resistor 74 and capacitor 75, in parallel, to the anode of diode 76 of "AND-INHIBIT" gate 34, and through resistor 174 and capacitor 175, in parallel, to the cathode of diode 176 of complement "AND-INHIBIT" gate 134.

The outputs from "AND-INHIBIT" gates 34 and 134 are coupled to "OR" gate 36 which gate includes a resistor 78 one end of which is connected to the cathode of a pair of diodes 79 and 80, which diodes have their cathodes connected in common and their anodes connected to the anodes of the diodes in the "AND-INHIBIT" gates.

The output from the "OR" gate is taken from the cathodes of diodes 79 and 80 and, as shown in FIGURE 3, coupled through a conventional code amplifier 81, a conventional pulse stretching multivibrator 82, and a conventional output amplifier 83 to a code flag 84. The code flag, of course, is operated only in response to a pulse to indicate correct operation of the device being tested.

The four pulse generators may be conventional and may, as shown typically in FIGURE 4, receive the input signal at the anode of diode 86, which diode has its cathode connected to the cathode of diode 87. The junction of the cathodes of diodes 86 and 87 is connected to the −12 volt D.C. power supply through resistor 88, which resistor may be variable, if desired. The anode of diode 87 is connected to the base of the PNP type transistor 89, which base is connected to ground through resistor 90 and coil 91, connected in parallel with one another, and resistor 92 and capacitor 93, also connected in parallel with one another. In addition, a resistor 94 is connected between the junction of resistors 90 and 92 and the +12 volt D.C. power supply (through resistor 88). The emitter of transistor 89 is connected to ground through resistor 96 and capacitor 97, connected in parallel, while the collector of transistor 89 is connected to the −12 volt power supply through resistor 98 and capacitor 99, also connected in parallel. If desired, capacitor 99 could be replaced with an inductor to increase the rise time of the output pulse. As shown in FIGURE 4, the output from the pulse generator may be taken directly from the collector of transistor 89.

In operation, when the pulse train to be tested is received, it will be coded in a particular manner. This coded signal, as shown in FIGURE 5, may consist of two framing pulses and six information bits wherein each of the six information bits is, in fact, a pulse. However, since there are six information bits, there are, of course, sixty-four possible combinations of pulse and no pulse bit states or conditions available for make-up of the coded signal. Thus, in the case of a transponder, each code is designated by number and differs from other codes only by the combination of information bits, that is, by their pulse or no pulse conditions. The sixty-four codes by number and bit conditions are as follows:

| Code No.: | Information pulses present |
|---|---|
| 00 | None |
| 01 | 4 |
| 02 | 5 |
| 03 | 4, 5 |
| 04 | 6 |
| 05 | 4, 6 |
| 06 | 5, 6 |
| 07 | 4, 5, 6 |
| 10 | 1 |
| 11 | 1, 4 |
| 12 | 1, 5 |
| 13 | 1, 4, 5 |
| 14 | 1, 6 |
| 15 | 1, 4, 6 |
| 16 | 1, 5, 6 |
| 17 | 1, 4, 5, 6 |
| 20 | 2 |
| 21 | 2, 4 |
| 22 | 2, 5 |
| 23 | 2, 4, 5 |
| 24 | 2, 6 |
| 25 | 2, 4, 6 |
| 26 | 2, 5, 6 |
| 27 | 2, 4, 5, 6 |
| 30 | 1, 2 |
| 31 | 1, 2, 4 |
| 32 | 1, 2, 5 |
| 33 | 1, 2, 4, 5 |
| 34 | 1, 2, 6 |
| 35 | 1, 2, 4, 6 |
| 36 | 1, 2, 5, 6 |
| 37 | 1, 2, 4, 5, 6 |
| 40 | 3 |
| 41 | 3, 4 |
| 42 | 3, 5 |
| 43 | 3, 4, 5 |
| 44 | 3, 6 |
| 45 | 3, 4, 6 |
| 46 | 3, 5, 6 |
| 47 | 3, 4, 5, 6 |
| 50 | 1, 3 |
| 51 | 1, 3, 4 |
| 52 | 1, 3, 5 |
| 53 | 1, 3, 4, 5 |
| 54 | 1, 3, 6 |
| 55 | 1, 3, 4, 6 |
| 56 | 1, 3, 5, 6 |
| 57 | 1, 3, 4, 5, 6 |
| 60 | 2, 3 |
| 61 | 2, 3, 4 |
| 62 | 2, 3, 5 |
| 63 | 2, 3, 4, 5 |
| 64 | 2, 3, 6 |
| 65 | 2, 3, 4, 6 |
| 66 | 2, 3, 5, 6 |
| 67 | 2, 3, 4, 5, 6 |
| 70 | 1, 2, 3 |
| 71 | 1, 2, 3, 4 |
| 72 | 1, 2, 3, 5 |
| 73 | 1, 2, 3, 4, 5 |
| 74 | 1, 2, 3, 6 |
| 75 | 1, 2, 3, 4, 6 |
| 76 | 1, 2, 3, 5, 6 |
| 77 | 1, 2, 3, 4, 5, 6, |

From the foregoing, it can be seen that if code 35, for example, is being checked, the bits in the pulse train should consist of pulses for both of the framing pulses plus pulses for bits 1, 2, 4 and 6. In other words, as shown in FIGURE 6(a), the only two information bits in a no pulse state are bits 3 and 5. As shown in FIG- URE 6(b), the complement code (which is derived by subtracting the code number from 77) would have pulses only at information bit 3 and 5, and would have a no pulse condition for information bits 1, 2, 4, and 6 (the framing pulses, of course, always being present as pulses). Thus the complement code of code 35 is 42, which code, as shown by the table, consists of information pulses only at bits 3 and 5.

As shown in FIGURE 7, each output from the delay line to the code recognition circuit is delayed for a time interval equal to the spacing between adjacent information bits or between an information bit and the adjacent information bit (which spacing is the same in both cases). Thus, when the framing pulses appear simultaneously in the code recognition circuit, this is the only time that all eight pulses can possibly be coincident (as shown within the dotted lines in FIGURE 7) to produce an output pulse from the code "AND" channel.

However, as also shown by FIGURE 7, when any code other than code 77 is utilized, at least one information bit will be in a no pulse state. Therefore, to provide the necessary coincidence of all eight pulses in the "AND" channel, provision is made to simulate pulses for information bits that are pre-selected to be in a no pulse state by selection of a particular code.

As shown in FIGURE 2, switches 43 can be preset in one of two positions. When connected to the +6 volt power supply, the information bit diode connected thereto is forward biased through the circuit consisting of the +6 volt power supply, resistor 42, diode 43, and diode 45 to ground. In the case of code 35, the switches 43 are preset so that information bit diodes 1, 2, 4, and 6 are connected to the +6 volt power supply, as shown by the solid lines of FIGURE 2. When a negative pulse is received at those diodes, each will be back biased and hence rendered non-conductive.

To provide a simulated pulse to the information bit diodes where no pulse is to be received in the coded signal, such as information bits 3 and 5 for code 35, for example, the switches 43 are repositioned from the +6 volt power supply to the −12 volt power supply. The diodes are then constantly back biased and, as far as coincidence is concerned, appear to be a pulse when the pulses of the coded signal are received.

Thus, when the pulses of the coded signal are coupled simultaneously to the coincidence circuit after the simulated pulses have been added (as shown by shading in FIGURE 8), a pulse will appear at the output of the "AND" channel. If one or more of the coincidence diodes should fail to receive a pulse, however, that diode will continue to conduct and, as a result, the output of the "AND" channel will remain clamped to preclude an output pulse from the channel. This is shown in FIGURE 9 where the information bits are erroneous with code 35 as a reference. As will be readily appreciated, even though simulated pulses have been added, there is still no coincidence of all eight pulses, as is necessary for an output pulse from the "AND" channel.

The "AND" channel is utilized to test the presence of sufficient pulses. The generation of an excess pulse is checked in the "OR" circuit of the code recognition circuit. As shown in FIGURE 2, the input information bits are also applied to the code "OR" channel by coupling six bits to the six diodes 47 therein. Since the channel will produce an output pulse if any one or more of the information bits appear as pulses, the diodes must be, in effect, blocked for those information bits which should be in the pulse state. This is done by clamping the anodes of diodes 47 to −12 volts by diode 48, which voltage is sufficient to render then non-conductive even in the presence of incoming pulses. However, where the information bit is to be in a no pulse state, the −12 volt D.C. is coupled through switch 43 to offset the −12 volts appearing at the anodes of diode 47. Thus, in the case of code 35, the +6 volts is coupled to the "OR" diodes 47 except for information bits 3 and 5 which have the −12 volts coupled thereto. Hence, only if a pulse appears at information bit 3 or 5 will there be an output from the code "OR" channel when the switches are set for code 35.

The complement code is checked in exactly the same manner as is the selected code and is preferably checked immediately after the selected code. The complement, as brought out hereinabove, being the opposite of the code selected, assures that each information bit will be tested both in its pulse and no pulse condition, and thus by merely checking one code and its complement, all codes are, in effect, checked for proper operation.

The complement of code 35, as brought out hereinabove, is code 42. As can be seen by checking the make-up of code 42, it comprises no pulse at each information bit where pulses appear in code 35 and pulses where no pulses are present in code 35. Switches 143 are connected in the complement code exactly opposite to that of the code recognition circuit, and hence the complement code may be checked without repositioning any switches in the testing apparatus so that one man can quite easily test a transponder without appreciable difficulty.

Figure 10:
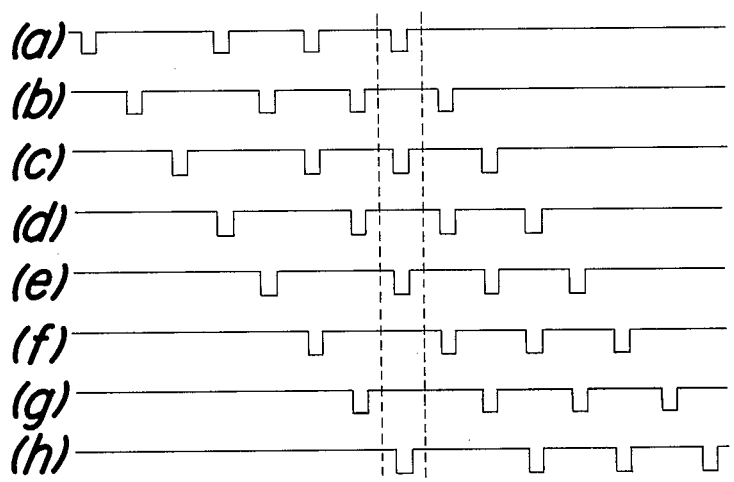
FIGURE 10 is a presentation of the complement coded reply signal as progressively delayed and coupled to the complement coded recognition circuit for the particular complement coded signal as shown in FIGURE 6(b)
Figure 11:
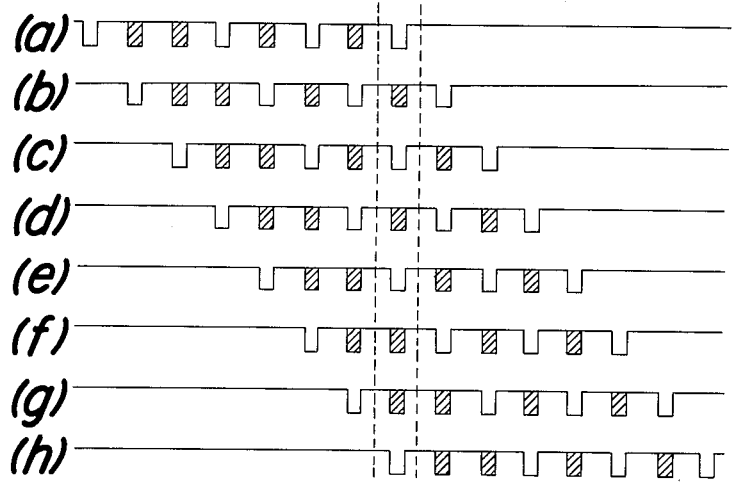
FIGURE 11 is a presentation similar to FIGURE 10 except that simulated pulses have been added in the complement recognition circuit.
Figure 12:
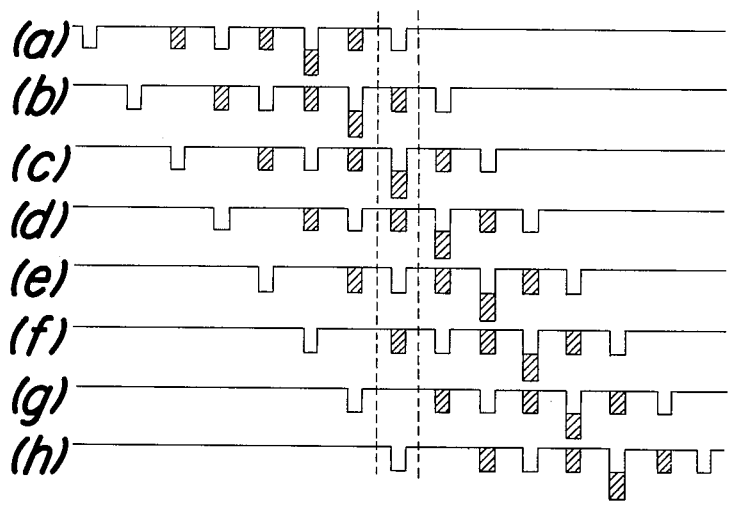
FIGURE 12 is a presentation of a complement coded reply signal with simulated pulses added wherein the information bits are erroneous with respect to FIGURE 6(b) as a reference.

As shown in FIGURE 10, the complement of code 35 requires simulated pulses for information bits 1, 2, 4, and 6. By setting switches 143, as shown in solid lines in FIGURE 2, simulated pulses are provided in the complement code recogntion circuit as shown by the combined pulses shown in FIGURE 11. If, however, as shown in FIGURE 12, the information bits are in error as to pulse state, then no coincidence will occur and there can be no output from the complement "AND" channel.

From the foregoing it can be seen that an output pulse from the "AND" channel occurs only when sufficient information pulses are present, while an output pulse from the "OR" channel occurs whenever there is an extra information pulse present.

The output pulse from the "AND" channel is coupled, as shown in FIGURE 3, through a pulse generator to the "AND-INHIBIT" gate, this pulse being positive after being inverted in the pulse generator, as shown in FIGURE 13(a). An output from the "AND-INHIBIT" circuit is possible only when the positive early narrow pulse, as shown by FIGURE 13(b), and late narrow pulse, as shown by FIGURE 13(c), occur in coincidence with the "AND" channel pulse.

As brought out hereinbefore, the pulses from the early and late generators are narrow with respect to the pulse from generator 32, and a check of spacing can therefore be maintained within rigid tolerances. The "AND-INHIBIT" gate produces a positive pulse when the narrow pulses from generators 26 and 27 occur simultaneously with the pulse from generator 32 since this reverse biases diodes 59, 66, and 76 and interrupts the normally present current flow through diode 69.

Even though coincidence should occur, however, there still can be no output from the "AND-INHIBIT" gate if a blanking negative pulse from the "OR" channel, as shown by FIGURE 13(d), should occur simultaneously with the three positive pulses. This is due to the fact that diode 60 is rendered conductive by the negative pulse and the current through diode 69 is therefore not interrupted.

Thus, when no negative pulse is present from the "OR" circuit, an output, as shown by FIGURE 13(e) is coupled to the "OR" gate. As shown by FIGURE 14, however, if an undesired pulse occurs to create a negative pulse from the "OR" channel, as shown by FIGURE 14(d), this blocks the production of an output pulse as shown by FIGURE 14(e).

In addition, and as shown by FIGURE 15, if the spacing between the framing pulses should be incorrect, then no output pulse can be produced from the "AND-INHIBIT" gate. When a pulse is produced at the output of the "AND-INHIBIT" gate, it is coupled through the "OR" gate and through the code amplifier, multivibrator and output amplifier to the code flag where proper operation of the equipment tested is indicated.

In view of the foregoing, it should be evident to one skilled in the art that the pulse testing apparatus of this invention provides an improved testing apparatus whereby each signal bit may be positively checked both in the pulse and no pulse conditions without requiring repositioning or switching of the testing device to thereby assure proper operation of all possible output code signals from the device being tested merely by testing one code and its complement.

What is claimed as my invention is:

1. An electrical pulse checking device for testing the output of apparatus capable of producing a coded signal having $n$ bits spaced between a pair of framing pulses, each of which bits may consist of either a pulse or the absence of a pulse whereby the output signal may be coded in a preselected manner, said checking device comprising: first decoding means for receiving a first coded signal having $n$ bits spaced between a pair of framing pulses, said first decoding means including first gate means; second decoding means for receiving a second coded signal having $n$ bits, each of which is complementary to the corresponding bit of said first coded signal and spaced between a pair of framing pulses corresponding to the framing pulses of said first coded signal, said second decoding means including second gate means; first and second pulse generating means each of which is connected to said first and second gate means, said pulse generating means receiving said coded signals and precluding an output pulse from said gate means unless the framing pulses of said received coded signals are spaced a predetermined distance; selector means connected to said decoding means for causing an output pulse to be produced from said first decoding means only when the bits of said received first coded signal correspond to a preselected code, and for causing an output pulse to be produced from said second decoding means only when the bits of said received second coded signal correspond to the complement of said preselected code; and indicating means connected to receive singularly said outputs from said decoding means to indicate that the apparatus tested is functioning properly.

2. An electrical pulse checking device for testing the output of apparatus capable of producing a signal having $n$ bits, each of which bits may be in a first state consisting of a pulse or in a second state consisting of no pulse whereby the output signal may be coded in a preselected manner, said checking device comprising: first code recognition means for receiving a first coded signal having $n$ bits, said code recognition means having first and second outputs; second code recognition means for receiving a second coded signal having $n$ bits each of which is the opposite of the corresponding bit of said first coded signal, said second code recognition means having first and second outputs; code selector means connected to said recognition means for causing an output pulse to be produced at the first output of said first code recognition means only when the bits of said first coded signal correspond in state to like bits consisting of pulses in a preselected code, said code selector means causing an output pulse to be produced at the first output of said second code recognition means only when the bits of said second coded signal correspond in state to like bits consisting of pulses in the complement of said preselected code, said code selector means also causing an output pulse to be produced at the second output of said first and second recognition means only when a bit in said first coded signal consists of a pulse while the like bit in said preselected code consists of no pulse and when a bit in said second coded signal consists of a pulse while the like bit in the complement of said preselected code consists of no pulse, respectively; first and second gate means connected to the outputs of said first and second code recognition means, respectively, said gate means passing an output pulse from said first output only in the absence of an output pulse from said second output; and indicating means connected to said gate means for receiving an output pulse from either to the exclusion of the other to indicate proper operation of the apparatus tested.

3. An electrical pulse checking device for testing the output of apparatus capable of producing a signal having $n$ bits spaced between a pair of framing pulses, each of which bits may be in a first state consisting of a pulse or a second state consisting of no pulse whereby the output signal may be coded in a preselected manner, said checking device comprising: first code recognition means for receiving a first coded signal having $n$ bits, said code recognition means having first and second outputs; second code recognition means for receiving a second coded signal having $n$ bits each of which is the opposite of the corresponding bit of said first coded signal, said second code recognition means having first and second outputs; code selector means connected to said recognition means and causing an output pulse to be produced at the first output of said first code recognition means only when the bits of said first coded signal correspond in state to like bits consisting of pulses in a preselected code, said code selector means causing an output pulse to be produced at the first output of said second code recognition means only when the bits of said second coded signal correspond in state to like bits consisting of pulses in the complement of said preselected code, said code selector means also causing an output pulse to be produced at the second output of said first and second recognition means only when a bit in said first coded signal consists of a pulse while the like bit in said preselected code consists of no pulse and when a bit in said second coded signal consists of a pulse while the like bit in the complement of said preselected code consists of no pulse, respectively; first and second pulse generating means for receiving said coded signals and producing coincident output pulses only if the framing pulses of each said received coded signal are spaced a predetermined distance; first and second gate means connected to receive the outputs from said first and second code recognition means, respectively, and the outputs from said first and second pulse generating means, said gate means producing an output pulse only when receiving coincident pulses of the same polarity from the first output of said code recognition means and from said pulse generating means to the exclusion of an output pulse from the second output of said code recognition means; and indicating means connected to said gate means for receiving the output pulse from either of said gate means to the exclusion of the other to indicate proper operation of the apparatus tested.

4. An electrical pulse checking device for testing the output of apparatus capable of producing a signal having $n$ bits, each of which bits may be in a first state consisting of a pulse or in a second state consisting of no pulse whereby the output signal may be coded in a preselected manner, said checking device comprising; a delay line; $n$ means for coupling a received coded signal from said delay line whereby each bit of said signal may be compared simultaneously with all other bits of said signal; first and second code recognition means for receiving the $n$ outputs from said delay line, each said recognition means having first and second outputs; code selector means for causing a simulated pulse to appear for each bit in said first and second code recognition means where no pulse appears in a preselected code and its complement, respectively; said first and second code recognition means producing an output pulse from said first output only when all bits consist of pulses when compared in said code recognition means, and producing an output pulse from said second output only when receiving a bit consisting of a pulse and a simulated pulse; first and second gate means connected to said first and second recognition means, respectively, to receive the output pulses from said recognition means and produce an output pulse only if said first output pulse occurs to the exclusion of said second output pulse; and indicating means connected to said gate means and responsive to an output pulse from one to the exclusion of the other to indicate proper operation of the apparatus tested.

5. An electrical pulse checking device for testing the output of apparatus capable of producing a signal having $n$ bits spaced between a pair of framing pulses, each of which bits may be in a first state consisting of a pulse or in a second state consisting of no pulse whereby the output signal may be coded in a preselected manner, said checking device comprising: a delay line; $n$ means for coupling a received signal from said delay line whereby each bit of said signal may be coupled simultaneously from said delay line; first and second code recognition means for receiving the outputs from said delay line, each said recognition means having first and second outputs; code selector means for causing a simulated pulse to appear in said first and second code recognition means where a no pulse state exists in a preselected code and its complement, respectively; said first and second code recognition means producing an output pulse from said first output only when receiving a pulse coincidently at each bit of said received signal, and said first and second code recognition means producing an output pulse from said second output only when receiving $n$ bits consisting of both a pulse and a simulated pulse; first pulse generating means connected to said delay line and producing output pulses substantially simultaneously with the framing pulses of said received signal; second pulse generating means connected with said delay line and producing an output pulse substantially simultaneously with the last framing pulse of said received signal; first and second "AND-INHIBIT" gate means connected to receive the outputs from said first and second recognition means, respectively, and the outputs from said first and second generating means, said gate means producing an output pulse only if the output pulse from said first output of said recognition means occurs coincidently with and of the same polarity as a pulse from said first generating means and a pulse from said second generating means and to the exclusion of a pulse from said second output of said recognition means; and indicating means connected with said "AND-INHIBIT" gate means and responsive to an output pulse from one to the exclusion of the other to indicate proper operation of the apparatus tested.

6. An electrical pulse checking device for testing the output of apparatus capable of producing a signal having $n$ bits timewise equally spaced between a pair of framing pulses, each of which bits may be in a first state consisting of a pulse or in a second state consisting of no pulse whereby the output signal may be coded in a predetermined manner, said checking device comprising: a delay line; first code recognition means for decoding a particular signal, said first code recognition means having first and second outputs; second code recognition means for decoding the complement of said particular coded signal, said second code recognition means having first and second outputs; means for tapping said delay line $n$ number of times to effect a time delay equal at each tap to the spacing between said bits; means connecting said taps to said recognition means; selector means connected to said first and second recognition means to preselect a particular code and its complement, respectively, whereby said first and second recognition means are caused to produce a negative output pulse at said first output only if the bits of said received coded signal correspond in state to like bits consisting of pulses in the preselected code and complement thereof, respectively, and whereby said first and second recognition means are caused to produce a negative output pulse at said second output only if any bit of said received signal is dissimilar to a like bit in a no pulse state of said preselected code and complement thereof, respectively; early narrow pulse generating means connected to said delay line to produce an output pulse of positive polarity substantially simultaneously with each framing pulse; late narrow pulse generating means connected to said delay line to produce an output pulse of positive polarity substantially simultaneously with the last framing pulse; third and fourth pulse generating means connected to the first outputs of said first and second code recognition means, respectively, and responsive to an output pulse therefrom to produce an output pulse of positive polarity; first "AND-INHIBIT" gate means connected to receive the second output of said first code recognition means and the outputs from said third generating means and said early and late narrow pulse generating means, said gate means producing an output pulse only when the inputs from said generating means are coincident but not coincident to a pulse from the second output of said first code recognition means; second "AND-INHIBIT" gate means connected to receive the second output of said second code recognition means and the outputs from said fourth generating means and said early and late narrow pulse generators, said gate means producing an output pulse only when the input from said generating means are coincident but not coincident to a pulse from the second output of said second code recognition means; an "OR" gate connected to receive said outputs from said "AND-INHIBIT" gates; and indicating means responsive to a singular signal coupled through said "OR" gate to indicate that said apparatus is functioning properly.

References Cited by the Examiner

UNITED STATES PATENTS 2,512,038  6/50  Potts _____ 178—23 X
2,997,540  8/61  Ertman et al. _____ 178—23

OTHER REFERENCES

2/60—Randlev, A Method to Determine at The Source The Validity of Transmitted Signals, IBM Technical Disclosure Bulletin, vol. 2, No. 5.

MALCOLM A. MORRISON, *Primary Examiner.*